UNITED STATES PATENT OFFICE.

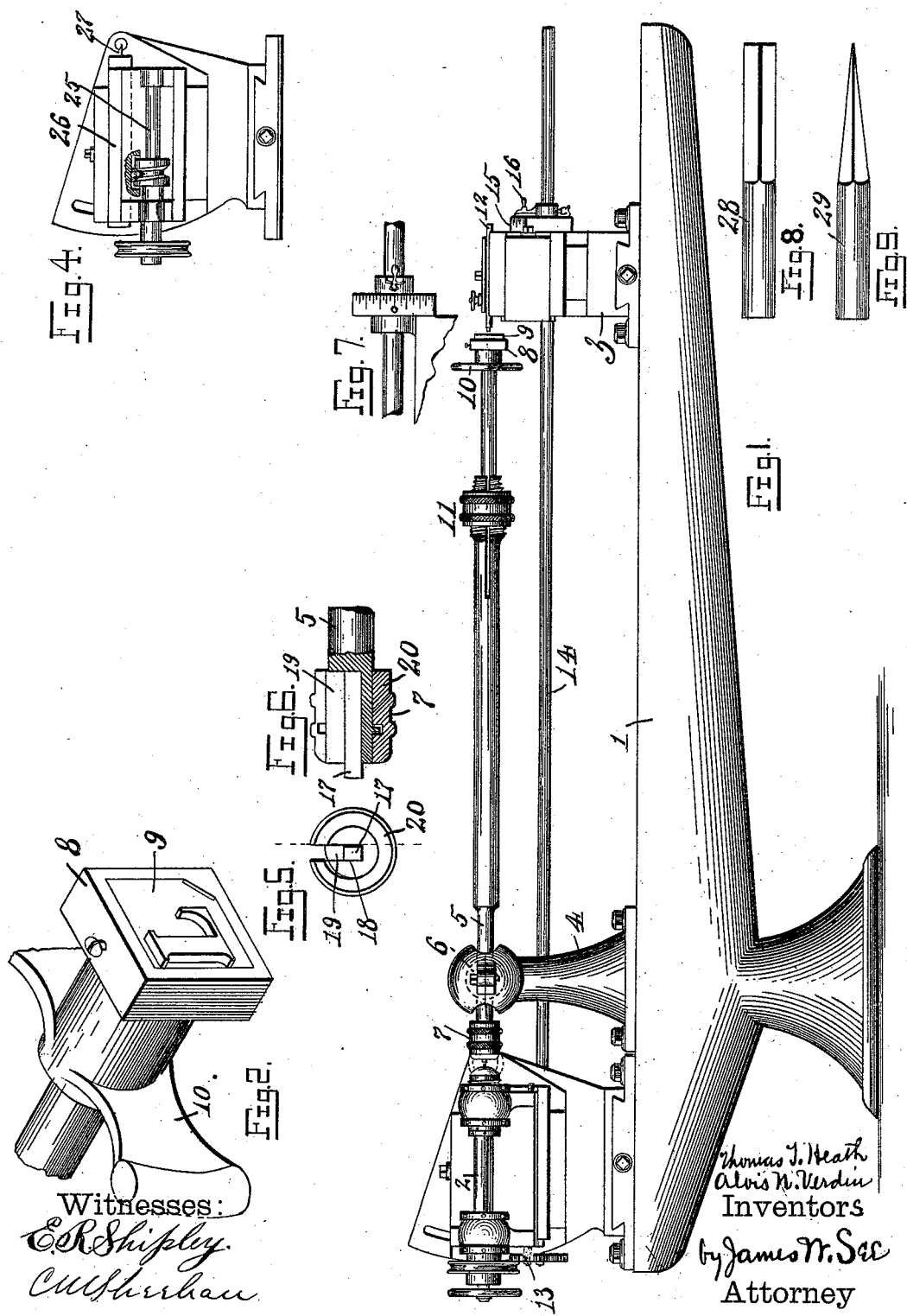

THOMAS T. HEATH, OF LOVELAND, AND ALOIS N. VERDIN, OF GLENDALE, OHIO; SAID VERDIN ASSIGNOR TO SAID HEATH.

PROFILING-MACHINE.

SPECIFICATION forming part of Letters Patent No. 553,984, dated February 4, 1896.

Application filed March 1, 1894. Renewed August 19, 1895. Serial No. 559,803. (No model.)

*To all whom it may concern:*

Be it known that we, THOMAS T. HEATH, of Loveland, Clermont county, and ALOIS N. VERDIN, of Glendale, Hamilton county, Ohio, have invented certain new and useful Improvements in Profiling-Machines, of which the following is a specification.

This invention pertains to improvements in machines designed for the cutting, after a templet, of letter-punches for type-founders' use and for use in matrix-making machines, and also for cutting type and similar objects generally.

Our improvements will be readily understood from the following description, taken in connection with the accompanying drawings, in which—

Figure 1 is a side elevation of a profiling-machine exemplifying our invention; Fig. 2, an enlarged perspective view of the templet-holding chuck thereof; Fig. 3, a front elevation of a chiseling attachment; Fig. 4, an end elevation of the blank-holding chuck; Fig. 5, a vertical longitudinal section of this chuck; Fig. 6, a plan of the depth-dial; and Figs. 7 and 8 side elevations, much enlarged, of cutting-tools.

In the drawings, 1 indicates a bed, similar to a lathe-bed; 2, a rotary spindle mounted in a head-stock on the bed; 3, a tail-stock on the bed; 4, a universal bearing mounted on the bed in line with the axis of spindle 2; 5, a rod mounted in this bearing; 6, a ball on this rod, journaled in bearing 4 and giving the rod a capacity for universal oscillating motion; 7, a chuck upon the end of rod 5, at the head-stock end thereof, adapted to receive the blanks or pieces of material on the end of which the cutting is to be done; 8, a chuck upon the tail-stock end of rod 5 to hold the templet which is to govern the cutting; 9, the templet secured therein and presenting itself toward the tail-stock; 10, a cross-handle on the rod near the templet-chuck by means of which the templet end of the rod may be freely moved transversely in any desired direction; 11, a telescopic joint in rod 5 by means of which the rod may be lengthened or shortened; 12, a guide-pin removably clamped in the tail-stock and having a cylindrical end adapted to engage the outlines of the templet; 13, a screw for shifting spindle 2 to and from chuck 7, the bearings of the spindle being mounted in a horizontal slide in the head-stock to permit of such motion; 14, a rod geared to this screw and extending back to and journaled in the tail-stock; 15, a graduated arc at the journal of rod 14 at the tail-stock; 16, a handle and pointer on the rod, operating with graduated arc 15 to indicate the degree to which screw 13 has been operated, the graduations being such, preferably, that each graduation represents one one-thousandth of an inch longitudinal movement of spindle 2 to or from chuck 7; 17, the blank to be cut, held in chuck 7; 18, a diametrical slot in the body of chuck 7 adapted to receive and hold the blank 17 axially in the chuck; 19, a keeper laid in the slot over the blank 17 and having its outer surface eccentric to the axis of the chuck, and 20 a shell fitted to turn on the body of the chuck and slotted to correspond with the slot in the body of the chuck, the bore of this shell at one margin of the slot being eccentric.

The operation of the machine will be described with reference to the cutting of type or letter punches, and blank 17 is to be taken as being a piece of metal to have a letter cut upon its end. The templet 9 has been made to correspond with a letter L, this particular templet when in use fitting the machine for the cutting of that letter upon the blank 17. The templets are made greatly enlarged—say about an inch in height—for cutting such letters as corresponding with ordinary newspaper-type. In making these templets the letter is accurately cut from metal about an eighth of an inch thick, and when done it is permanently secured to a block adapted to fit chuck 8. By means of telescope 11 rod 5 may be lengthened or shortened, so as to alter the degree of reduction, as between templet and completed work, which is to be effected in the cutting. In putting the blank in chuck 7 the slot in the shell is made to correspond with the slot in the body, and the blank is then put in place, with the keeper above it, and the shell is then turned, thus clamping the blank. Tail-stock 3 is to be shifted to near the templet and secured to the bed. A cutter, like 28, but very much smaller, is to be chucked in the spindle, and the spindle is to be set into rapid rotation. We will assume that the letter is to be cut fifteen one-thousandths of an inch deep—that is to say, the face of the letter when done is to project that far from its ground. Handle 16 is to be operated to bring the end of the cutter exactly even with the face of the blank. Guide-pin 12 is then to be unclamped and advanced till its end is in position to engage the outline of the templet. The chuck-rod is then to be swung until the blank is entirely free from the range of the cutter. Handle 16 is then to be advanced fifteen one-thousandths of an inch. As the chuck-rod is so manipulated as to cause its outline to present itself at all accessible points to guide-pin 12 the cutter will rout away the outline of the letter upon the blank, the cutting having an axial depth of fifteen one-thousandths of an inch. The active end of pin 12 is to have such diameter with relation to the diameter of the cutter and with relation to the proportionate reduction in the cutting that the cutter will produce a somewhat enlarged outline in doing its work. In other words, the guide-pin is to be a trifle larger than the diameter of the cutter would call for if the cutter was to rout down to the desired outline. The result of this routing is that the bulk of the metal has been quickly cut away by a comparatively heavy cutter, that the cutter and guide-pin are to change to follow the sharp curves and angles to be produced, that the outline produced is a trifle full, and that the blocked-out letter projects substantially square from the ground of the blank. In other words, no draft or taper has been given to the cutting. Handle 16 is now operated to move the cutter away from the work, and the cutter is removed, and a second cutter of smaller size and having some taper is substituted, and handle 16 is then adjusted to bring the end of the cutter exactly even with the face of the letter. A second guide-pin 12, with a smaller end, is now substituted for the one previously used, and handle 16 is adjusted to bring the cutter, say, thirteen one-thousandths of an inch toward the blank. This permits the end of the cutter to clear the previously-cut ground two one-thousandths of an inch. The previous operation of cutting is then repeated, the taper-cutter in this case cutting away some metal at all of the outline previously left and cutting into curves and angles which the previously-used cutter could not deal with, and producing also a draft or taper entirely around the letter, this taper or draft starting two one-thousandths of an inch from the ground. The cutter is then removed and a pointed cutter like 29 substituted and adjusted with its point exactly even with the face of the latter. This cutter is to have known diameters and tapers, and in the exemplifying cutting under consideration it is to have at any part of its length to be brought into use a diameter less than that of the second cutter which was employed. A new guide-pin 12 is now to be employed having a diameter at its active end corresponding, proportionately, with the diameter of cutter 29 at a distance twelve one-thousandths of an inch from the point of the cutter. The profiling is now repeated with this pointed cutter set, say, to work a depth of twelve one-thousandths of an inch, the result being the cutting away of a trifle of metal wherever the letter has been previously cut, and the giving of the draft or taper due to the new cutter and the cutting into angles and curves which the previously-used cutters could not deal with. If the letter should have interior cuts without outlets the cutting-spindle would be adjusted endwise and then fed up to the work cutting a depth of twelve one-thousandths of inch, and while the cutter is thus in such produced recess it is to do any cutting which the guide-pin engaging the templet will permit. That guide-pin engaging the templet will permit of any cutting suited to the diameter of the pointed cutter at the given distance from its end—viz., twelve one-thousandths of an inch—that being the depth of working for the pointed cutter when that particular guide-pin is employed. This finishes all of the cutting that can be done with that cutter when working at a depth of twelve one-thousandths of an inch. The cutter is now withdrawn, say, three one-thousandths of an inch, and a guide-pin is employed suited to the diameter of the cutter at such depth of working, and with this depth of working the profiling is proceeded with, the cutter now going into curves and angles which it was not before capable of or permitted to enter. Then the depth of cutting is decreased and another corresponding guide-pin employed, and so on, until finally the work is done, the depth of cutting being made dependent on the diameter of the pointed cutter at that depth, and the action of the cutter being controlled by a guide-pin suited to the working diameter of the cutter.

All has been described which is essential to the operation of the machine in the cutting of any type-letters of an ordinary printer's font. In practice, in a machine having templets about an inch high and making type of ordinary letter forms of any size which will go on a blank two-tenths of an inch square, an operative with two weeks' practice can cut thirty punches per day, perfect, except that they require their faces to have two or three strokes over an oil-stone to remove the bur; and this capacity is based on working the blanks from the rough in the manner above indicated. Where a lot of blanks are put through the roughing routing operation together, &c., so that each adjustment is required but once for the lot of punches, then this stated capacity will be greatly exceeded; and as regards perfection of produce it may be stated that in our opinion the punches produced are superior in all respects to any punches of which we have any knowledge, regardless of the process by which they are produced.

For any ordinary letter-work the cutter-spindle may maintain a fixed axial position, as indicated in Fig. 1; but in some peculiar kinds of work it may be desirable to incline the axis of the cutter and shift it vertically and sidewise. It will be observed that the head-stock makes provision for all such adjustments, the tail-stock also being capable of shifting the guide-pins vertically or horizontally. When work is done with the cutter thus set at angles the profiling must be limited to one side of the object being cut—say, for instance, the upper side, the rod being turned for operation on a new side when the first side is completed.

When using the machine in the manner previously indicated, the entire work of cutting may be done at one setting of templet and work.

In some kinds of cutting it is impossible to produce the desired work with a rotary cutter, and a chisel cutter or graver is therefore needed. In such case we remove the head-stock shown in Fig. 1 and substitute the one shown in Fig. 4, in which the spindle 25 reciprocates a cutter-bar 26, which carries a chisel or graver 27. This chisel rapidly reciprocates into and out of the work while its movements are controlled by the templet and guide-pin, the cutting being confined, however, to one side at a time, as in the case of an angularly-set rotary cutter, it being most always necessary in using chisel-cutters to have them reciprocate at an angle to the face of the work.

We claim as our invention—

1. In a profiling-machine, the combination, substantially as set forth, with a rigidly-supported cutter, guide-pin and universal bearing, of an integrally-united structure comprising a blank, a templet, and a ball-journal between the blank and templet.

2. In a profiling-machine, the combination, substantially as set forth, of a horizontal chuck-rod universally journaled at an intermediate point in its length and carrying an outwardly-presenting blank-chuck at one end and an outwardly-presenting templet-chuck at the other end, a rigidly-supported guide-pin presenting its end toward said templet-holding chuck, an endwise-adjustable cutter presenting its cutting-point toward said blank-chuck, and means near said templet-chuck for moving said cutter to and from said blank-chuck.

3. In a profiling-machine, the combination, substantially as set forth, of a horizontal chuck-rod universally journaled at an intermediate point in its length and carrying an outwardly-presenting chuck at each end, a rigidly-supported guide-pin presenting its end toward one of said chucks, a cutter presenting its point toward the other of said chucks, a bearing for said cutter, an adjusting-screw for moving said cutter-bearing to and from the end of the chuck-rod, a handle near said guide-pin for operating said screw, and means for adjusting said cutter-bearing transversely and angularly.

4. In a profiling-machine, the combination, substantially as set forth, of a horizontal chuck-rod universally journaled at an intermediate point in its length and having a templet-holding chuck at one end, a chuck at the other end of the rod having a longitudinally-slotted body, a keeper in said slot, an eccentric-slotted shell engaging said slotted body and keeper, a cutter presenting its point toward the open end of said slot, and means for adjusting said cutter to and from said rod.

THOMAS T. HEATH.
ALOIS N. VERDIN.

Witnesses:
M. B. FERRIS,
I. J. MILLER.